United States Patent [19]
Kato et al.

[11] Patent Number: 5,401,157
[45] Date of Patent: Mar. 28, 1995

[54] MOLDING MACHINE

[75] Inventors: Takefumi Kato; Shigeru Morita; Kiminori Sato, all of Saga, Japan

[73] Assignee: Nok Corporation, Tokyo, Japan

[21] Appl. No.: 111,784

[22] Filed: Aug. 26, 1993

Related U.S. Application Data

[62] Division of Ser. No. 875,469, Apr. 29, 1992, Pat. No. 5,273,418.

[51] Int. Cl.$^6$ .............................................. B29C 37/00
[52] U.S. Cl. ................................. 425/186; 425/192 R; 425/195; 425/338; 425/451
[58] Field of Search ............ 425/186, 188, 190, 192 R, 425/193, 195, 338, 339, 378.1, 394, 397, 406, 451, 544

[56] References Cited

U.S. PATENT DOCUMENTS

| | | | |
|---|---|---|---|
| 709,285 | 9/1902 | Wilkes | 425/338 |
| 2,217,627 | 10/1940 | Tanzi | 425/188 |
| 3,528,132 | 9/1970 | Greenberg et al. | 425/193 |
| 3,993,787 | 11/1975 | Nakabayashi et al. | 425/125 |
| 4,140,449 | 2/1979 | Takeshi et al. | 425/193 |
| 5,182,121 | 1/1993 | Miyashita et al. | 425/338 |
| 5,186,958 | 2/1993 | Schmidt | 425/195 |

*Primary Examiner*—Charles S. Bushey
*Attorney, Agent, or Firm*—Jacobson, Price, Holman & Stern

[57] ABSTRACT

A molding machine has a mold material supply device, a die setting device, a separating device and a deburring device. The supply device includes a mold material feeding device, an extruding device for receiving a mold material from the mold material feeding device and extruding the mold material so as to form an extruded mold material, a cutting device for cutting the extruded mold material, and a transfer device for receiving the extruded mold material from the cutting device and transferring the same. The die setting device includes a distribution plate, a first mold die, a second mold die, a third mold die, four shafts, a first mold guide fixed to one of the shafts for receiving and supporting the distribution plate, a second mold guide fixed to another shaft for receiving and supporting the first mold die, a third mold guide fixed to another shaft for receiving and supporting the second mold die, a fourth mold guide for receiving and supporting the third mold die, and means for rotating and vertically moving the four shafts together with the respective mold dies and the respective mold guides and the distribution plate, wherein the distribution plate, the first mold die, the second mold die and the third mold die are positioned in order. The separating device includes a nipping device having a plurality of fixed claws and movable claws in combination for nipping the molding products remaining in the second mold die when the fixed and movable claws are closed and releasing the molded products when the fixed and movable claws are opened.

8 Claims, 19 Drawing Sheets

MOLDING MACHINE

This is a Divisional of application Ser. No. 07/875,469, filed Apr. 29, 1992, now U.S. Pat. No. 5,273,418.

BACKGROUND OF THE INVENTION

The present invention relates to a molding machine for producing products of a rubber-like resilient material, particularly gaskets or packings for automotive vehicles.

U.S. Pat. No. 3,993,787 discloses a molding machine for producing products of a rubber-like resilient material, particularly oil seals in which a first mold part is stationarily supported in axial spaced relation to a main base. A base between the main base and the first mold part is axially movable toward and away from the first mold part and supports a second complementary mold part. A holder between and axially spaced from the first and second mold parts is mounted for limited axial movement and rotary movement in a plane parallel to the first and second mold parts, with the holder carrying two diametrically opposite further mold parts spaced apart an equal distance from the axis of the rotary movement. One of the further mold parts is in substantially registry with the first and second mold parts so that movement of the base relative to the holder brings the second mold part into operative relation to the one further mold part and continued movement of the movable base moves the holder toward the first mold part until the first mold part, one further mold part and second mold part are assembled to provide a molding space therein for receiving the molding metarial. Means are provided for introducing a reinforcing ring into the other further mold part of the holder prior to its movement to the position occupied by the one further mold part during molding and to remove the completed article from the one further mold part when it occupies the position of the other further mold part during molding. In additon, means are provided for removing the molding flash after the mold opening and for transporting the flash to discharge means. Also, means are employed to retain the two further mold parts at diametrically opposite points in the holder as well as to prevent rotation and tilting of the mold parts relative to the holder.

SUMMARY OF THE INVENTION

It is an object of the present invention to provide a molding machine equipped with a separating means which can simultaneously separate many molded products or articles from a mold die.

It is a further object of the present invention to provide a molding machine equipped with a deburring means which can simultaneously separate spool runners or burs from a mold die or a distribution plate.

It is another object of the present invention to provide a molding machine including a die setting means which is compact and requires only a small space.

It is still another object of the present invention to provide a molding machine which can operate at low production costs with a good efficiency.

According to the present invention, a molding machine includes a mold material supply means, a die setting means, and a separating means.

The mold material supply means has a mold material feeding means, an extruding means for receiving a mold material from the mold material feeding means and extruding the mold material so as to form an extruded mold material, a cutting means for cutting the extruded mold material, and a transfer means for receiving the extruded mold material from the cutting means and transferring the same.

The die setting means includes a distribution plate, a first mold die, a second mold die, a third mold die, four shafts, a first mold guide fixed to one of the shafts for receiving and supporting the first mold die, a second mold guide fixed to another shaft for receiving and supporting the second mold die, a third mold guide fixed to another shaft for receiving and supporting the third mold die, a fourth mold guide for receiving and supporting the distribution plate, and means for rotating and vertically moving the four shafts together with the respective mold dies and the respective mold guides and the distribution plate. The distribution plate, the first mold die, the second mold die and the third mold die are positioned in order.

The separating means includes a nipping means having a plurality of fixed claws and movable claws in combination for nipping the molded products remaining in the second mold die when the fixed and movable claws are closed and releasing the molded products when the fixed and movable claws are opened.

The molding machine is preferably equipped with a deburring means including a nipping means having a plurality of fixed claws and movable claws in combination for nipping burs or spool runners remaining in the first mold die and/or the distribution plate when the fixed and movable claws are closed and releasing the molded products when the fixed and movable claws are opened.

It is preferable that the extrusion means of the mold material supply means comprises a cylindrical pot for receiving the mold material, a press cylinder means placed over the pot, and a feeding means for feeding the mold material into the pot. The press cylinder means is equipped with a ram for pressing the mold material in the pot so as to extrude the mold material. The pot has a lower open end closed by a cover having a through-hole for the injection or extrusion purpose. The feeding means of the mold material supply means is arranged in position between the ram and the pot. The feeding means includes a cylindrical portion and a locating cylinder means for shifting the cylindrical portion in position between the pot and the ram when the mold material is to be fed into the pot.

It is also preferable that the cutting means of the mold material supply means comprises a transportation means including a cutting blade for cutting the extruded mold material so as to have a predetermined length, a plurality of guide rails having groove means, and a cylinder means for shifting the transportation means along the groove means of the guide rails.

In a preferred mode of the present invention, the groove means has two straight portions and an inclined intermediate portion disposed between the two straight portions so that the transportation means can partly rotate at the inclined intermediate portion whereby the transportation means can change from an inclined condition in which the blade of the transportation means cuts the extruded mold material to a horizontally maintained condition.

The transfer means of the mold material supply means preferably comprises a suction member for receiving the extruded and cut mold material from the transportation means of the cutting means and holding the mold material due to its sucking force, and means for moving the suction member between the cutting means and the die setting means so that the mold material can be transferred from the transportation means to the distribution plate of the die setting means.

It is also preferable that the die setting means further includes a gear mechanism connected to the four shafts for rotating simultaneously the four shafts, means for rotating the four shafts around their axes, means for vertically shifting or actuating the four shafts, an upper plate, a lower plate between which the distribution plate and the mold dies are placed, and means for tightening the distribution plate and the mold dies in an assembled condition. This tightening means includes a ram for pressing the distribution plate and the mold dies between the upper and lower plates when they are assembled.

In the die setting means, each of the mold dies has a plurality of cavities and the distribution plate has a plurality of through-holes in such a way that the through-holes of the distribution plate are connected to the cavities of the mold dies when they are assembled for the molding purpose.

Preferably, the nipping means of the separating means includes an actuating cylinder means for moving the movable claws relative to the fixed claws between their closed or nipping position and their open or releasing position. The separating means further includes means for pushing a projection against the second mold die so that the molded products can be separated from the second mold die.

It is preferable that the deburring means includes an actuating cylinder means for moving the movable claws relative to the fixed claws between their closed or nipping position and their open or releasing position. The deburring means may include a first deburring apparatus placed below the distribution plate and a second deburring apparatus placed above the first mold die.

PREFERRED EMBODIMENTS OF THE INVENTION

Figure 1:
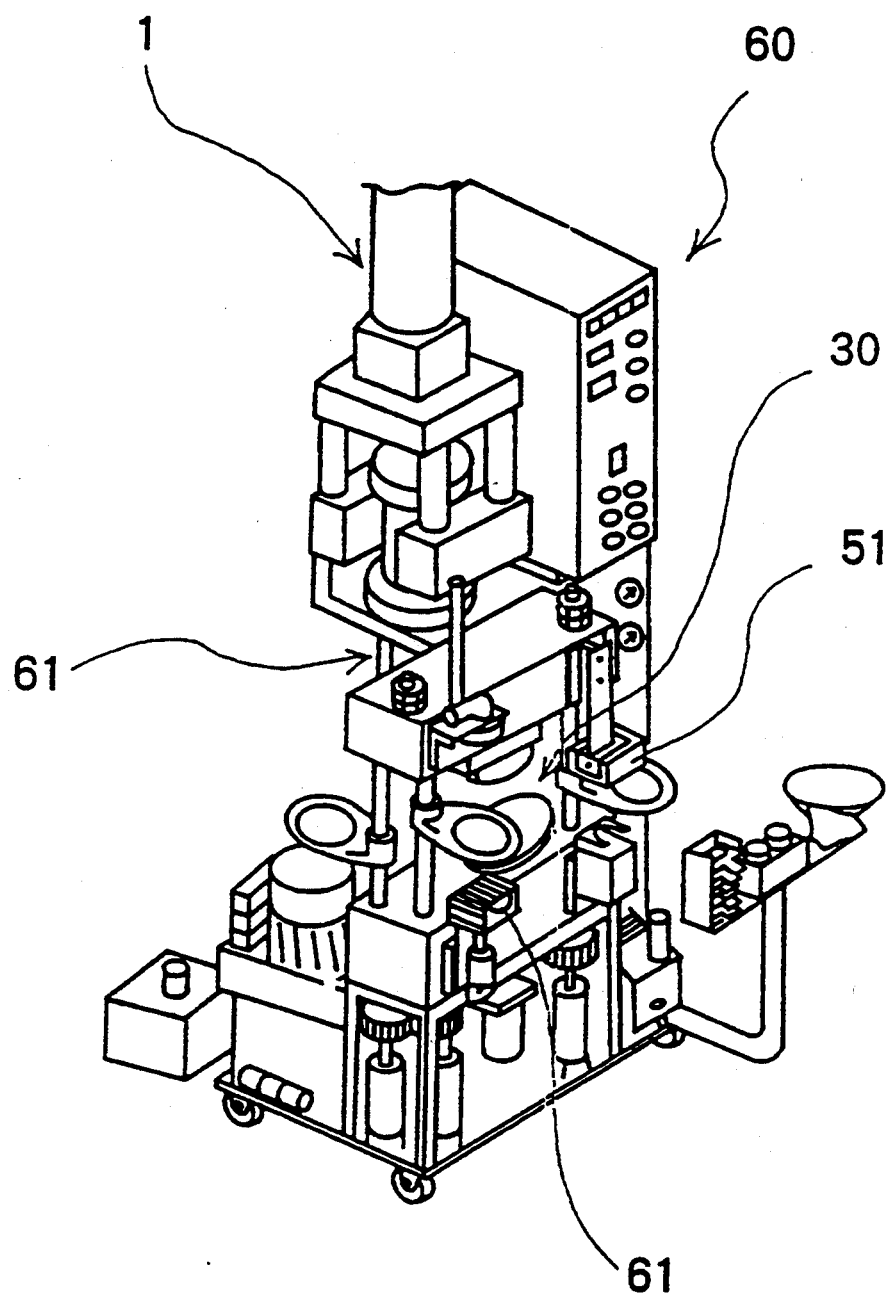
FIG. 1 is a schematic perspective view showing a molding machine according to a preferred embodiment of the present invention.

FIG. 1 schematically shows a molding machine 60 including a mold material supply means 1, a die setting means or apparatus 30, a separating means or apparatus 51 and two deburring means or apparatus 61. The mold material supply means 1 is designed to supply mold materials 10 (FIG. 2) into the die setting means 30. The die setting means 30 sets plural dies and a ditribution plate in the molding machine 60. The separating means 51 simultaneously separates molded articles or products from the dies. The deburring means 61 simultaneously separate or remove burs or spool runners from the distribution plate.

Figure 2:
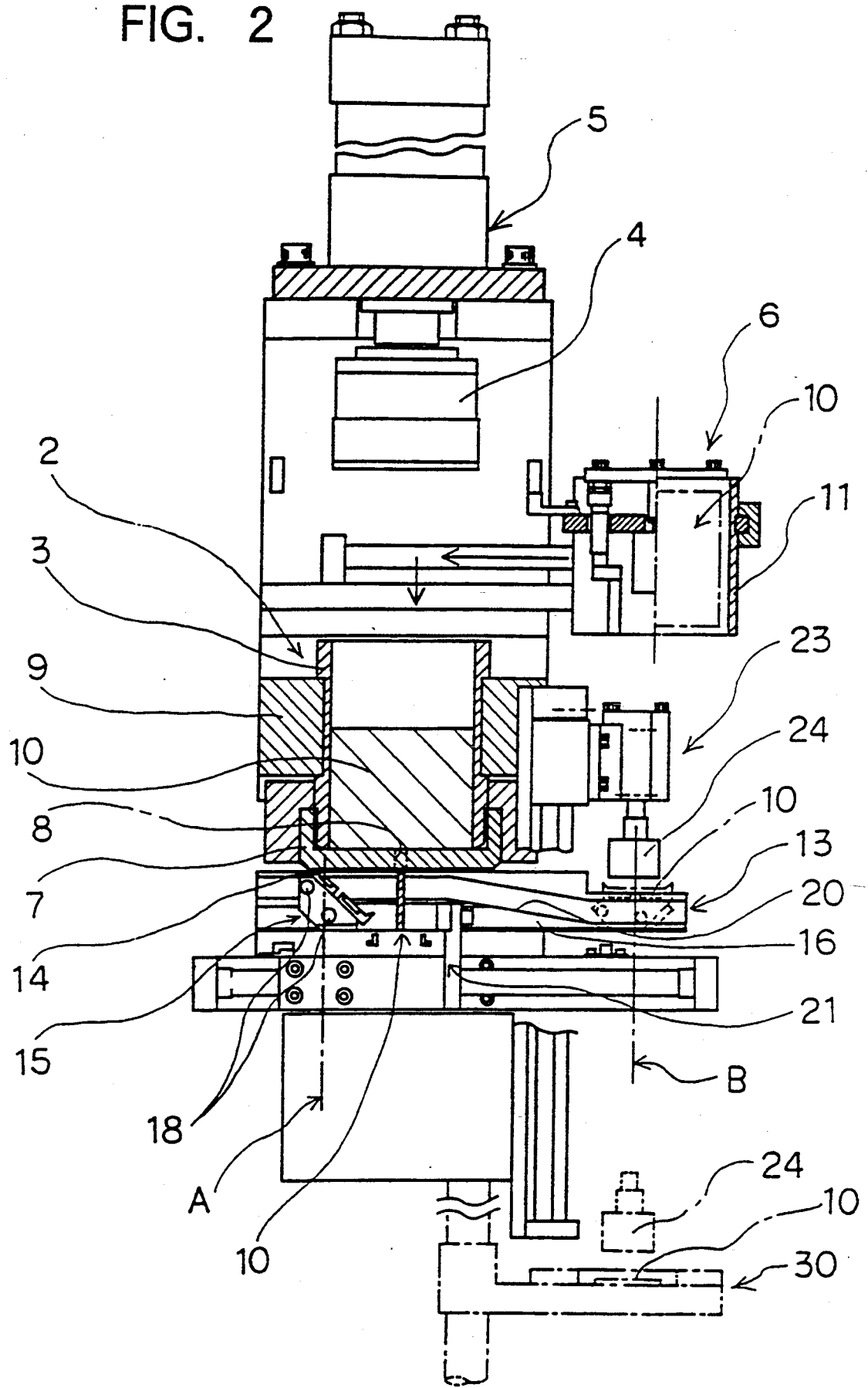
FIG. 2 is a front view showing a mold material feeding apparatus of the molding machine shown in FIG. 1.
Figure 3:
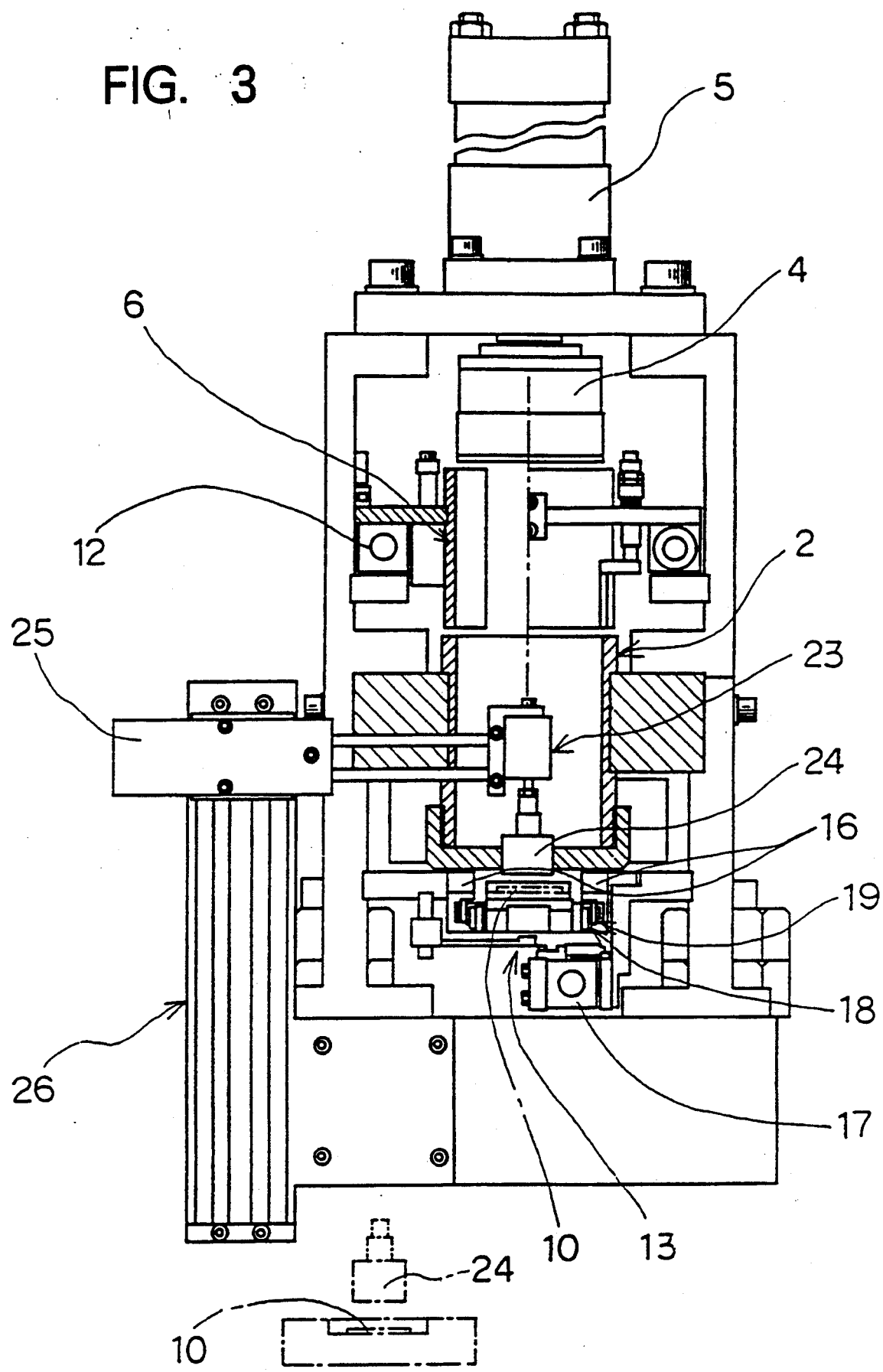
FIG. 3 is a side view of the mold material feeding apparatus shown in FIG. 2.
Figure 4:
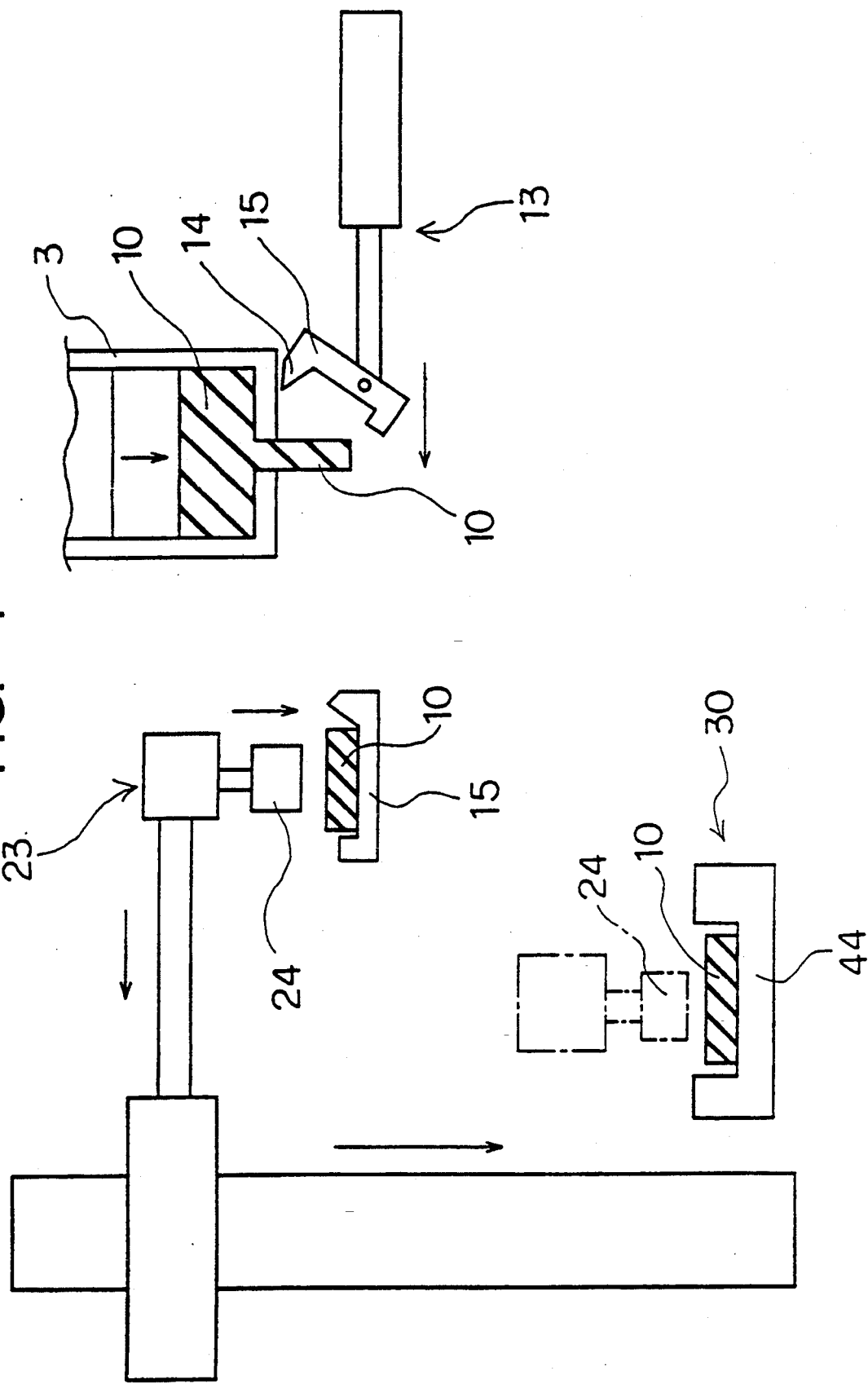
FIG. 4 is an explanation view showing how to cut and transfer an extruded mold material in a cutting apparatus of the molding machine of FIG. 1.
Figure 5:
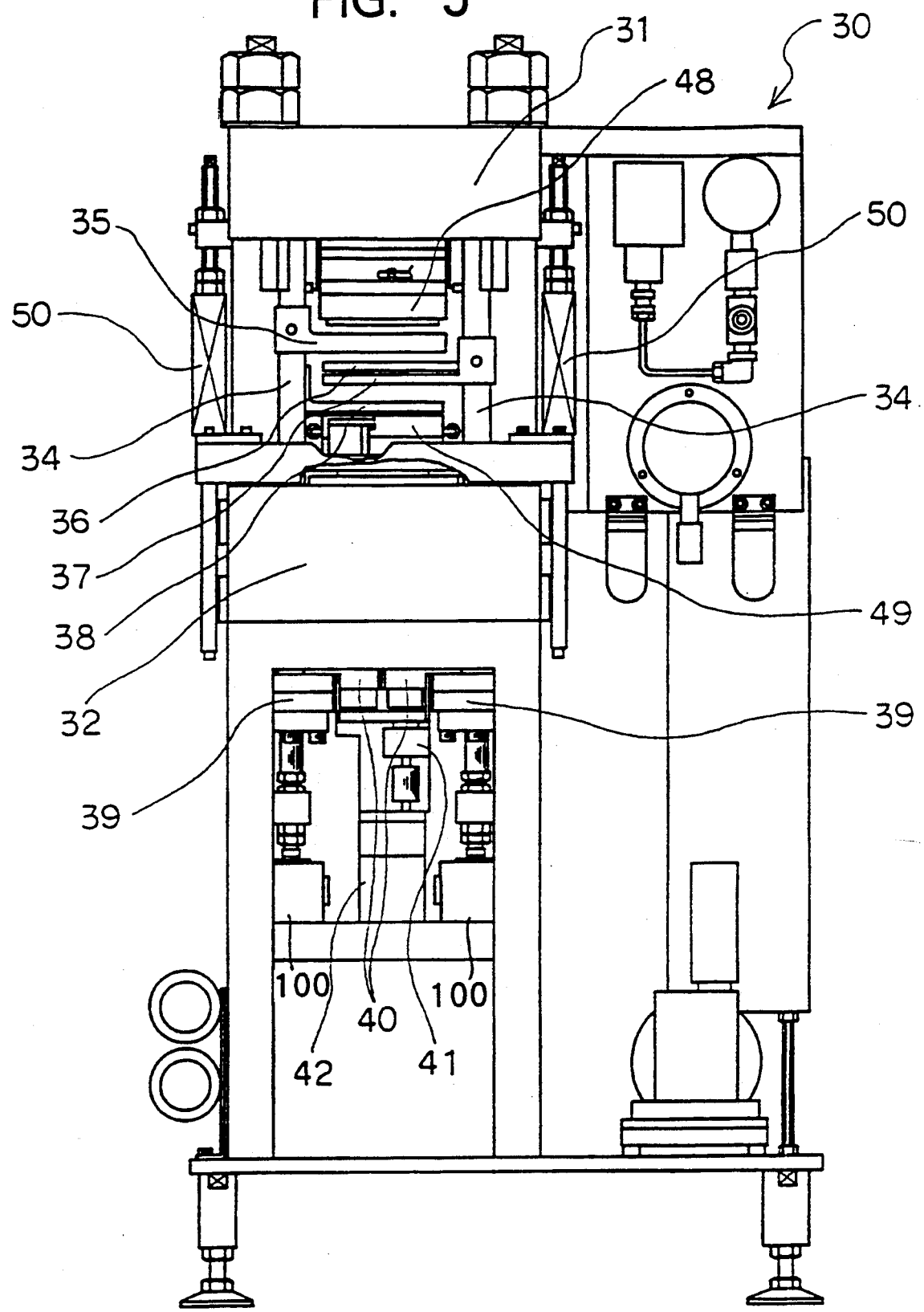
FIG. 5 is a schematic explanation view showing a die setting apparatus of the molding machine shown in FIG. 1.

As shown in FIGS. 2 to 4, the mold material supply means 1 includes an extrusion means 2, a cutting means 13 and a transfer means 23. The mold material 10 is extruded by the extrusion means 2 and then cut by the cutting means 13. After that, the extruded material is supplied into the die setting means 30 by means of the transfer means 23.

The extrusion means 2 includes a cylindrical pot 3 for receiving the mold material 10 or one lot of mold materials 10 therein, a press cylinder means 5 placed over the pot, and a feeding means 6 for feeding the mold material or materials 10 into the pot 3. The press cylinder means 5 is equipped with a ram 4 which can move into the pot 3 for pressing the mold material 10 within the pot.

A lower end opening of the pot 3 is closed by a cover 7 having a through-hole 8 for the injection purpose. A heater 9 is arranged around the pot 3 for heating the mold material 10 in the pot 3. The mold material 10 is extruded through the hole 8 so as to flow down under the bottom of the pot 3 or the cover 7 so as to form an extruded mold material 10 when it is pressed by the ram 4 in the pot 3.

The feeding means 6 is arranged in position between the ram 4 and the pot 3. The feeding means 6 includes a cylindrical portion 11 and a locating cylinder means 12 for shifting or locating the cylindrical portion 11 in position between the pot 3 and the ram 4 whenever one lot of the mold materials 10 is just to be supplied into the pot 3.

The cutting means 13 includes a transportation member 15, a plurality of guide rails 16, and a shifting cylinder means 17. The transportation member 15 includes a cutting blade 14 for cutting the formed mold material or extruded body 10 so as to have a predetermined shape. The shifting cylinder means 17 shifts or locates the transportation member 15 along the guide wails 16 in the direction at a right angle to a direction of extruding the mold material 10. These guide rails 16 constitute a pair of grooves 20 each having an upper straight portion, a lower straight portion and a slightly inclined intermediate portion positioned between the upper and lower straight portions as best shown in FIG. 2. A plurality of bearings 19 are joined via shafts 18 to the transportation member 15 and set in such a manner that they can rotatably move in the grooves 20. The transportation member 15 is joined by way of a joint member 21 to the shifting means 17. Thus, when the shifting means 17 is actuated, the cutting means 15 moves along the grooves 20 of the guide rails 16 through the shafts 18 and the bearings 19. At that time, the transportation member 15 partly rotates around one of the shafts 18 at the inclined area of the grooves 20. As a result, as shown in FIG. 2, the transportation member 15 is inclined at a point A so as to have an inclined angle 45° to it moving direction or a horizontal direction while it is maintained in parallel to its moving direction or a horizontal direction at a point B. In other words, the transportation member 15 is positioned in an inclined condition at the point A while it is positioned in a horizontally maintained condition a the point B. When the transportation member 15 moves in its inclined condition, it cuts the extruded body 10 so that the body 10 moves from the extrusion means 2 into the transportation member 15. The formed body 10 and the transportation member 15 together move along the grooves 20 toward the point B and then partly rotate at the inclined area of the grooves 20. At the point B, the transportation member 15 and the formed body 10 together are maintained in a horizontal direction.

The transfer means 23 includes a suction member 24, a horizontally shifting cylinder means 25 and a vertically shifting means 26. The suction member 24 is connected to a vacuum pump (not shown) so as to hold the formed body 10 by its sucking force when the vacuum pump is actuated after the formed body is cut by the blade of the cutting means 13. The horizontally shifting cylinder means 25 shifts the suction member 24 in a horizontal direction. The vertically shifting cylinder means 26 shifts the suction member 24 in a vertical direction. The formed body 10 is transferred from the transportation member 15 to a distribution plate 44 by means of the horizontally shifting cylinder means 25 and the vertically shifting cyliner means 26 of the transfer means 23 after it is lifted by the suction means 24 due to its sucking force.

Figure 6:
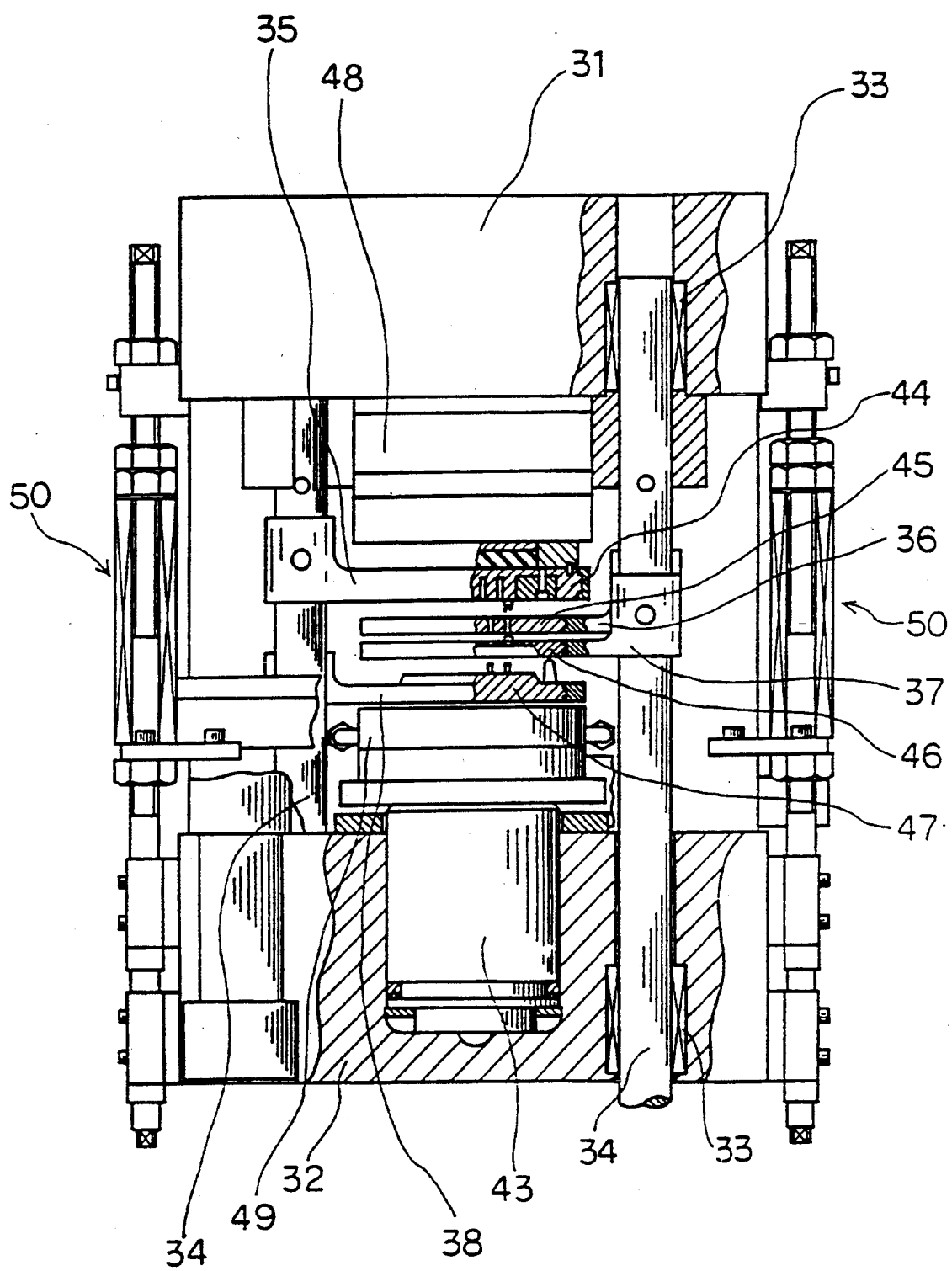
FIG. 6 is an enlarged view showing an upper portion of the die setting apparatus shown in FIG. 5.
Figure 12:
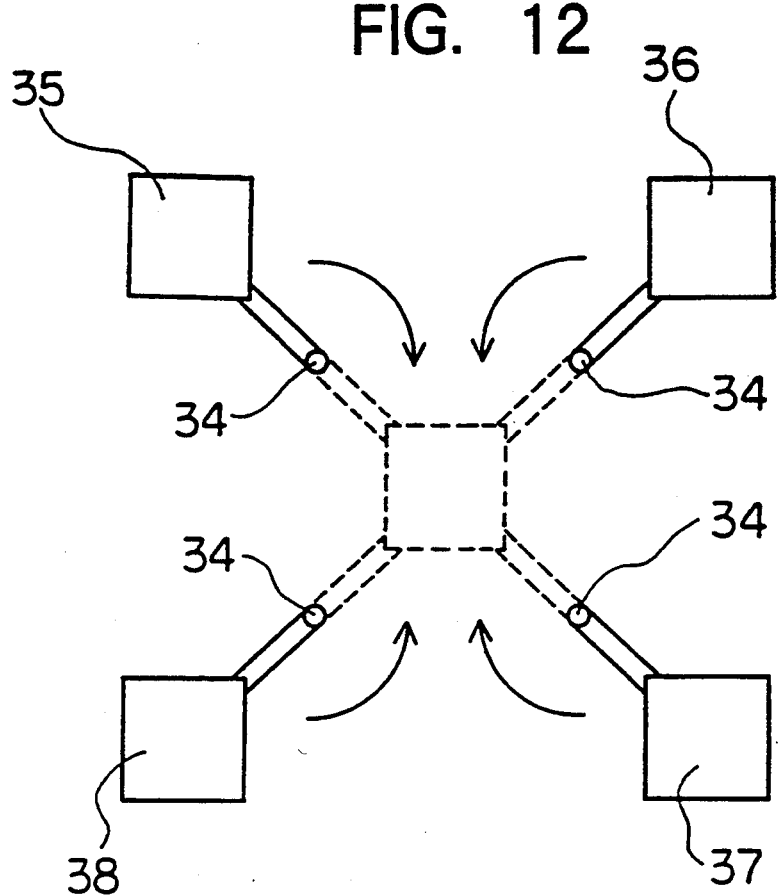
FIG. 12 is an explanation view showing how to operate four mold guides in the die setting apparatus.
Figure 13:
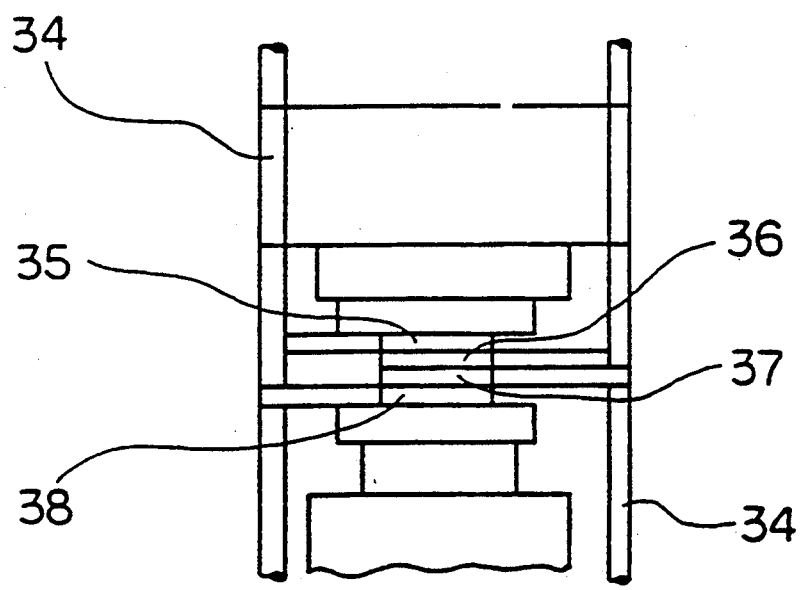
FIG. 13 is a schematic front view showing a condition in which the four mold guides are assembled between a lower plate and an upper plate in the die setting apparatus.
Figure 14:
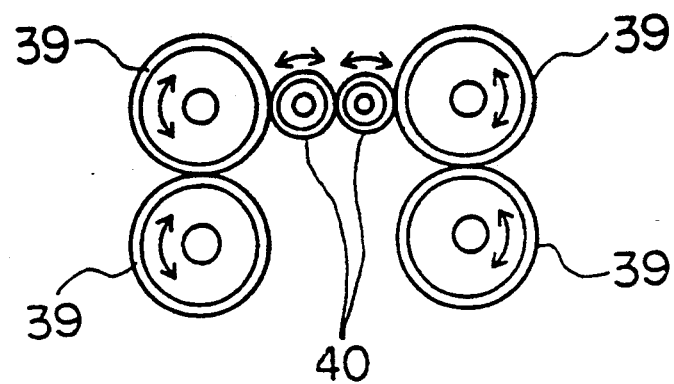
FIG. 14 is an explanation view showing gears connected to the four mold guides by way of shafts in the die setting apparatus.

Referring to FIGS. 5 to 14, the die setting means 30 includes a distribution plate 44, three dies 45 to 47 and a control means for controlling the positions and movement of the distribution plate 44 and the three dies 45 to 47. The distribution plate 44 and the three dies 45 to 47 are placed between an upper plate 31 and a lower plate 32 in the die setting means 30. Four shafts 34 are vertically supported by plural thrust bearings 33 in parallel to each other as best shown in FIG. 6 in such a way that the shafts 34 can rotate around their axes and slide in a vertical direction. Four mold guides 35, 36, 37, 38 are fixed to the four shafts 34, respectively. A gear 39 is fixed to a lower end portion of each of the four shafts 34. As shown in FIG. 14, the four gears 39 are connected to each other directly or through two gears 40. One of the four shafts 34 is joined via a joint member 41 such as a coupling to a rotation actuation means 42 such as a motor. Also, the four shafts 34 are connected to four vertically shifting or actuating means 100, respectively, so that the shafts 34 can move up and down in a vertical direction simultaneously or independently or in any other manner. Thus, the four shafts 34 can rotate and vertically move together with the mold guides 35 to 38, the mold dies 45 to 47 and the distribution plate 44.

For example, the distribution plate 44 is set in the mold guide 35, and the first mold die 45 is set in the mold guide 36, and the second mold die 46 is set in the mold guide 37, and the third mold die 47 is set in the mold guide 38.

Figure 7:
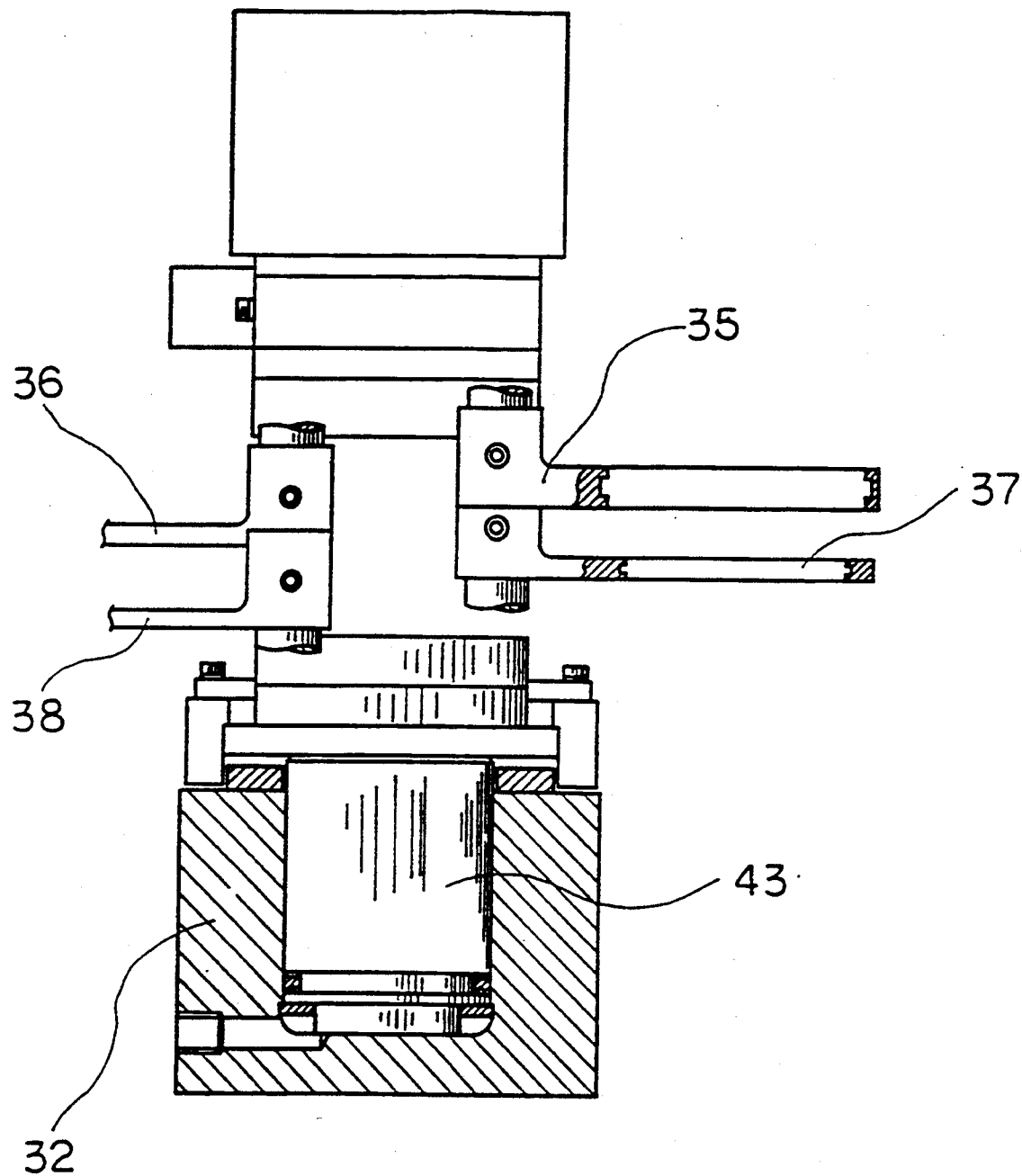
FIG. 7 is a side view showing a part of the upper portion of the die setting apparatus shown in FIG. 6.
Figure 8:
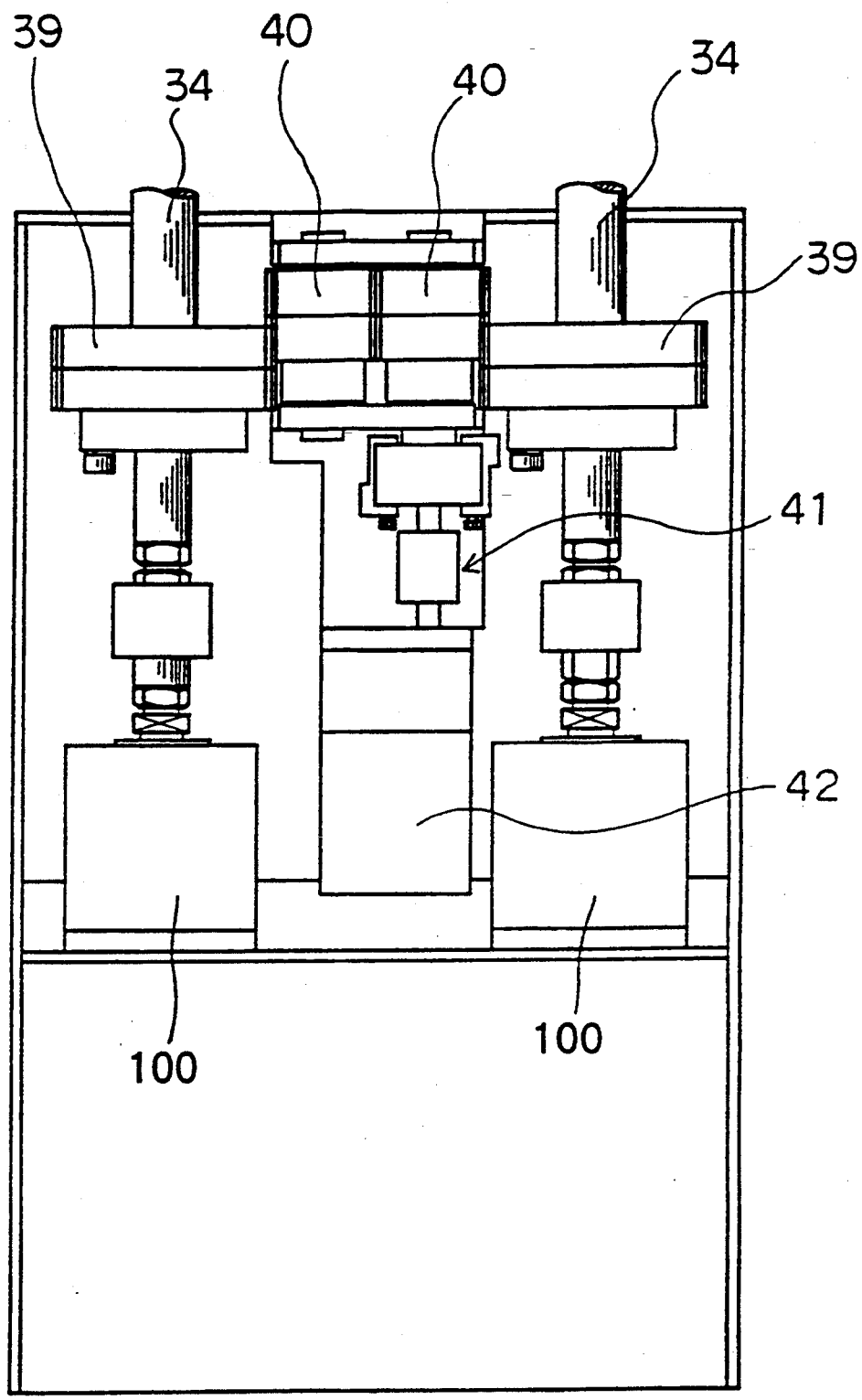
FIG. 8 is an enlarged view showing a lower portion of the die setting apparatus shown in FIG. 5.
Figure 9:
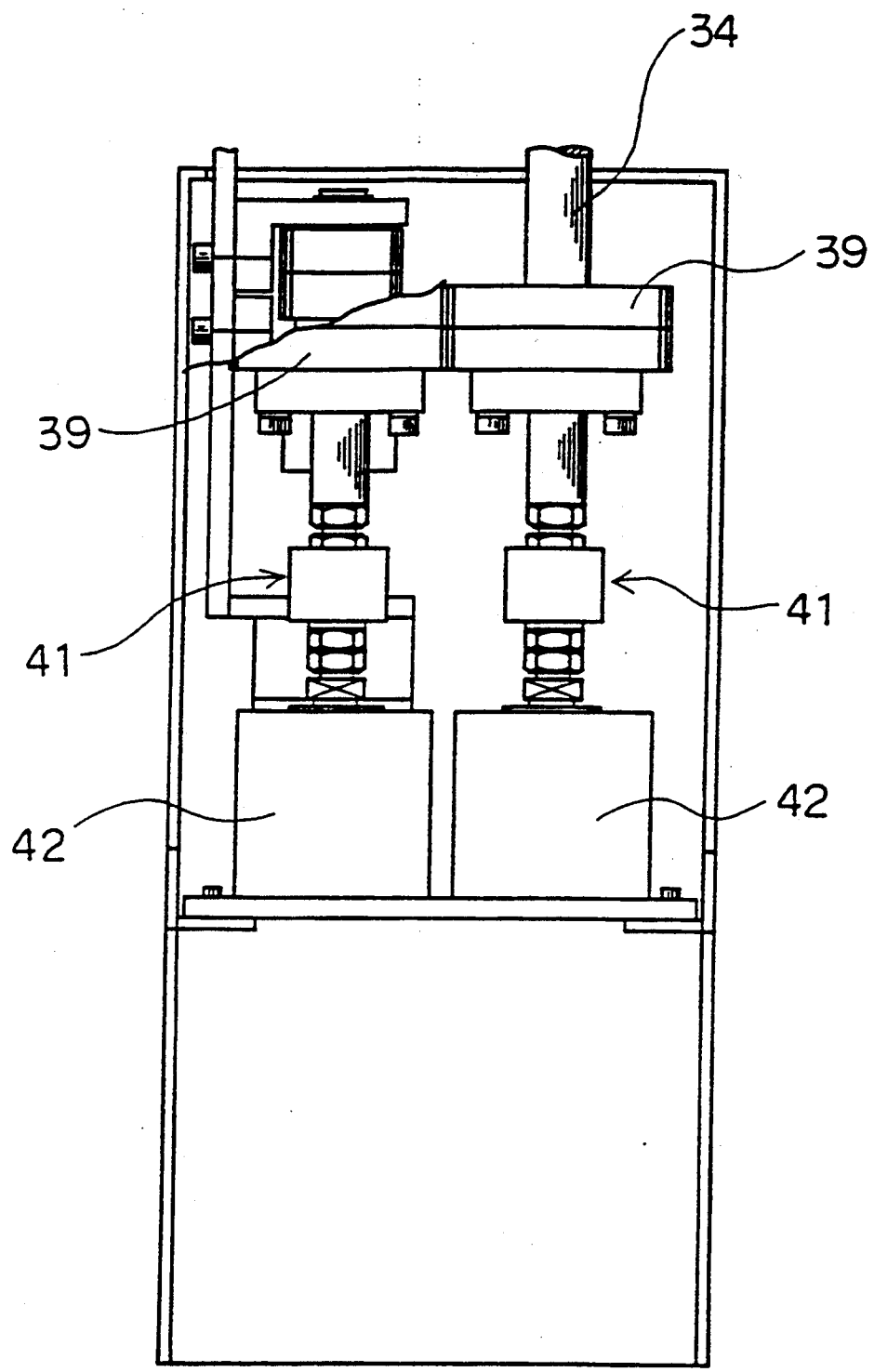
FIG. 9 is a side view showing the lower portion of the die setting apparatus.
Figure 15:
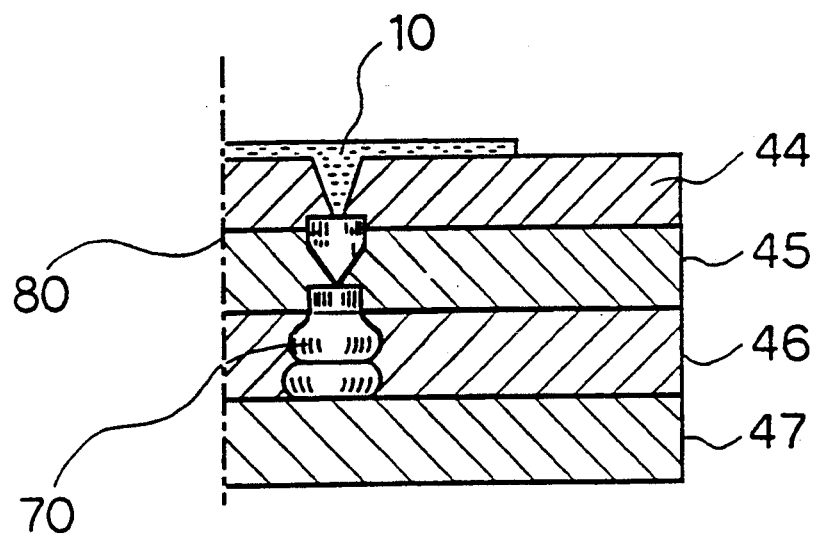
FIG. 15 is a sectional view showing a distribution plate and three mold dies in an assembled condition with one molded product or article in which the other products are omitted for the purpose of simplifying the figure.

At first, all of the mold guides 35 to 38 are separately positioned in both vertical and horizontal directions as shown in FIG. 7 and FIG. 12. In other words, the distribution plate 44 and the three mold dies 45 to 47 together with the mold guides 35 to 38 are completely disassembled in both horizontal and vertical directions. Next, the four shafts 34 rotate about their axes so that the mold guides 35 to 38 are assembled only in a vertical direction. After that, the four shafts 34 vertically move toward their predetermined levels so that the mold guides 35 to 38 are completely assembled in a horizontal direction in addition to the vertical direction. Therefore, the distribution plate 44 and the three mold dies 45 to 47 together with the mold guides 35 to 38 are lapped over one another as shown in FIG. 13. In this closed condition, the distribution plate 44 and the mold dies 45, 46, 47 are lapped as shown in FIG. 15 but without molded products. In addition, it is preferable that the mold guides 35 to 38, the distribution plate 44 and the mold dies 45, 46, 47 are pressed by the ram 43 between the upper plate 31 and the ram 43 so that the mold dies can be perfectly tightened. No gaps remain among the mold guides 35 to 38, the distribution plate 44 and the mold dies 45, 46, 47.

Figure 10:
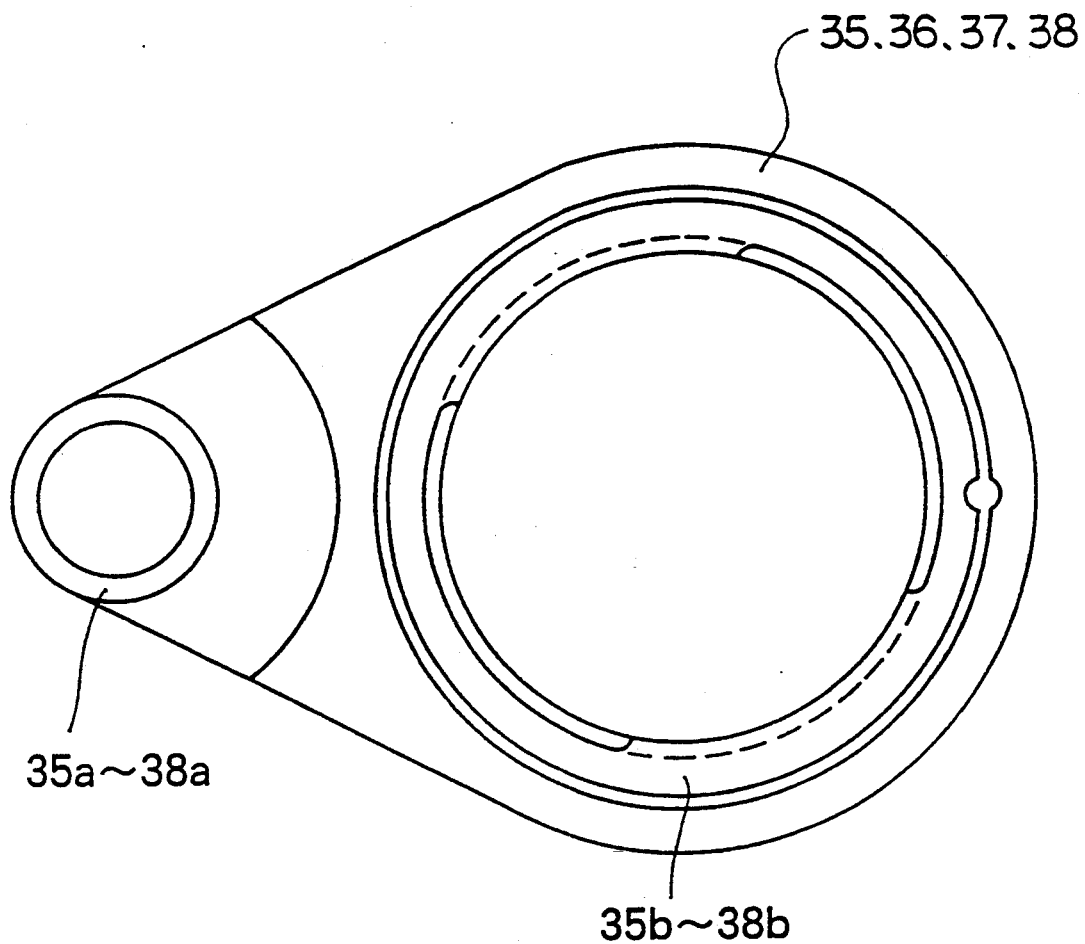
FIG. 10 is a plan view showing a mold guide of the die setting apparatus.
Figure 11:
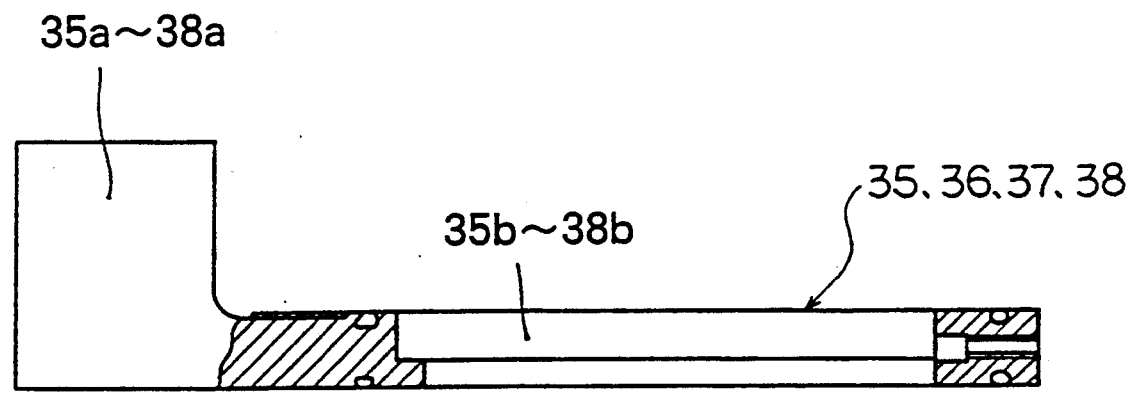
FIG. 11 is a sectional view showing a mold guide of the die setting apparatus.

FIGS. 10 and 11 show a preferred shape of the mold guides 35 to 38. Each of the mold guides 35 to 38 has a small-diameter portion 35a to 38a fixed to the shafts 34 and a large-diameter portion 35b to 38b for supporting the mold dies 45 to 47 and the distribution plate 44. For example, the first mold guide 35 has a stepped large-diameter opening for receiving and supporting the distribution plate 44 therein. The second mold guide 36 has a stepped large-diameter opening for receiving and supporting the third mold die 45 therein. The third mold guide 37 has a stepped large-diameter opening for receiving and supporting the first mold die 46 therein. The fourth mold guide 38 has a stepped large-diameter opening for receiving and supporting the second mold die 47 therein. It is easy to attach the distribution plate 44 and the mold dies 45 to 47 into the openings of the mold guides 35 to 38, respectively.

Figure 23:
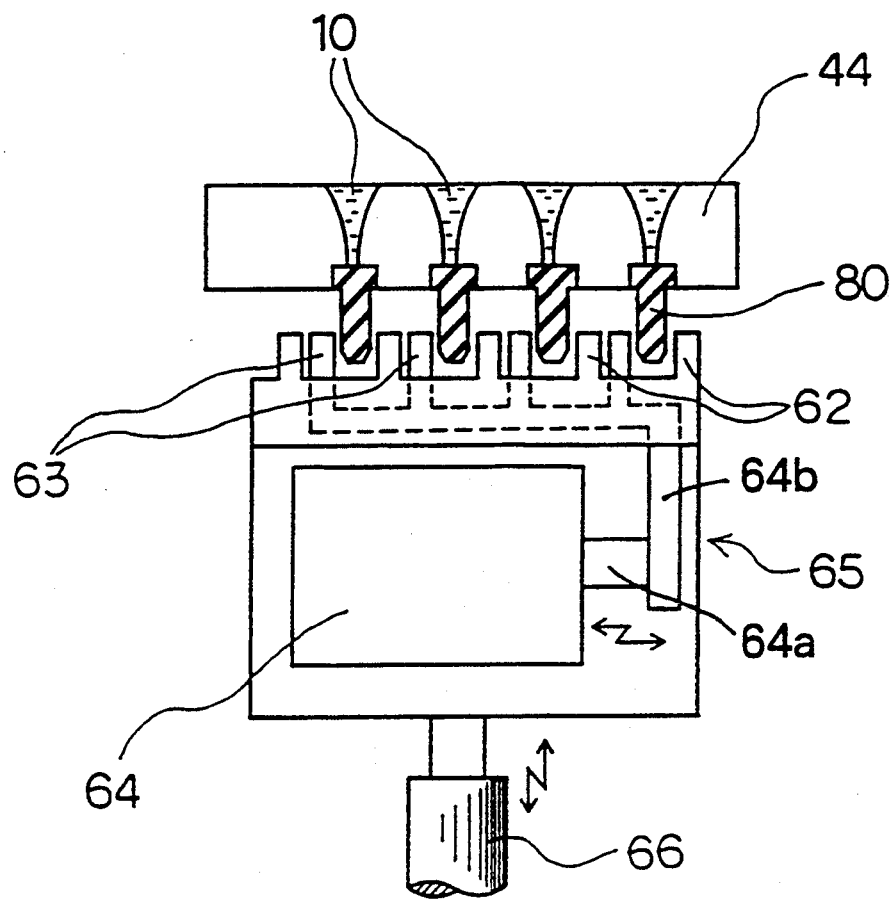
FIG. 23 is an explanation view showing the relationship between the nipping means of the deburring apparatus shown in FIG. 20 and burs or spool runners remaining in a distribution plate.
Figure 24:
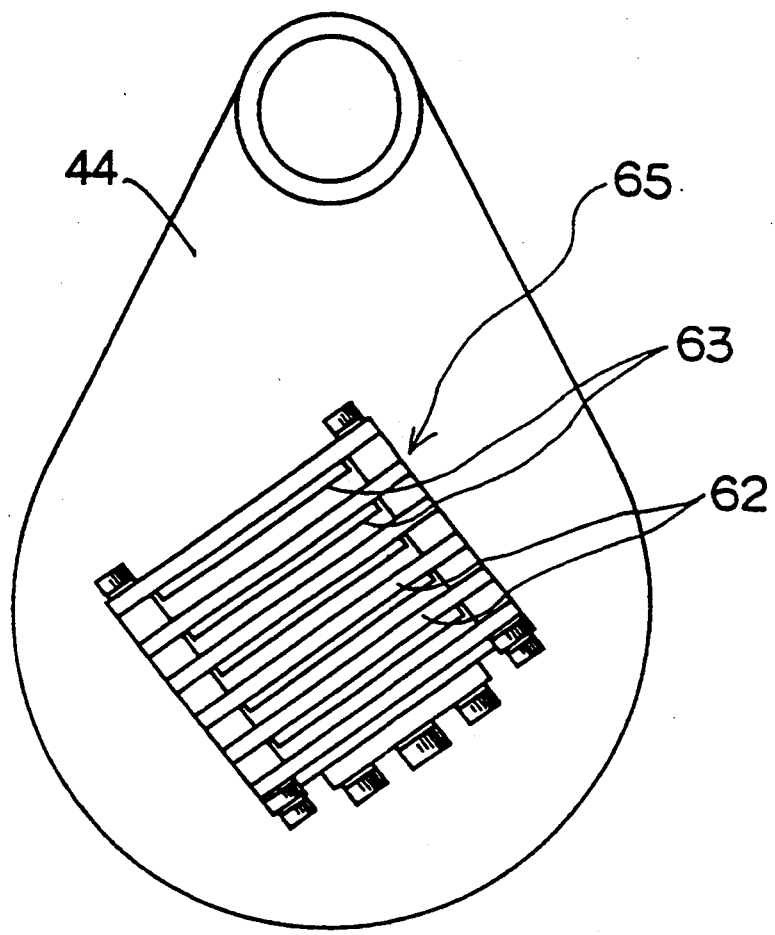
FIG. 24 is a botton view showing the relationship between the distribution plate of the die setting apparatus and the nipping means of the deburring apparatus.

FIG. 15 shows typically one article or product 70 molded in each of the mold dies 45 to 47 for the purpose of simplifying the figures although many products are molded. Many cavities are formed in each of the mold dies 45 to 47 in the corresponding positions. Those cavities are connected via many through-holes formed in the distribution plate 44. The formed body 10 is heated in the distribution plate 44 so that it can be easily flown into the cavities of the mold dies by way of the through-holes of the distribution plate 44 when they are completely assembled. A bur or spool runner 80 is formed in each through-hole of the distribution plate 44. Thus, many spool runners 80 remain at the underside of the distribution plate 44 as shown in FIG. 23. Some spool runners 80 remain in the first mold die 45 in such a manner that a top portion of each spool runner 80 slightly protrude from the top surface of the first mold die 45.

One example of the molded product 70 is a rubber gasket or packing for a connector in automotive vehicles although the present invention is not limited to it.

Referring to FIGS. 16 to 19, the separating means 51 is placed above the die setting means 30 and includes a nipping means 55 and a vertically shifting means (not shown) for shifting the nipping means 55 toward the second mold die 46 when the second mold die 46 is outwardly positioned in the open or disassembled condition of FIG. 12. The nipping means 55 includes a plurality of fixed claws 52 each having an L-shape in cross section, a plurality of movable claws 53 each having a reversed L-shape in cross section, and an actuating cylinder means 54 for moving the movable claws 53 relative to the fixed claws 52.

Figure 16:
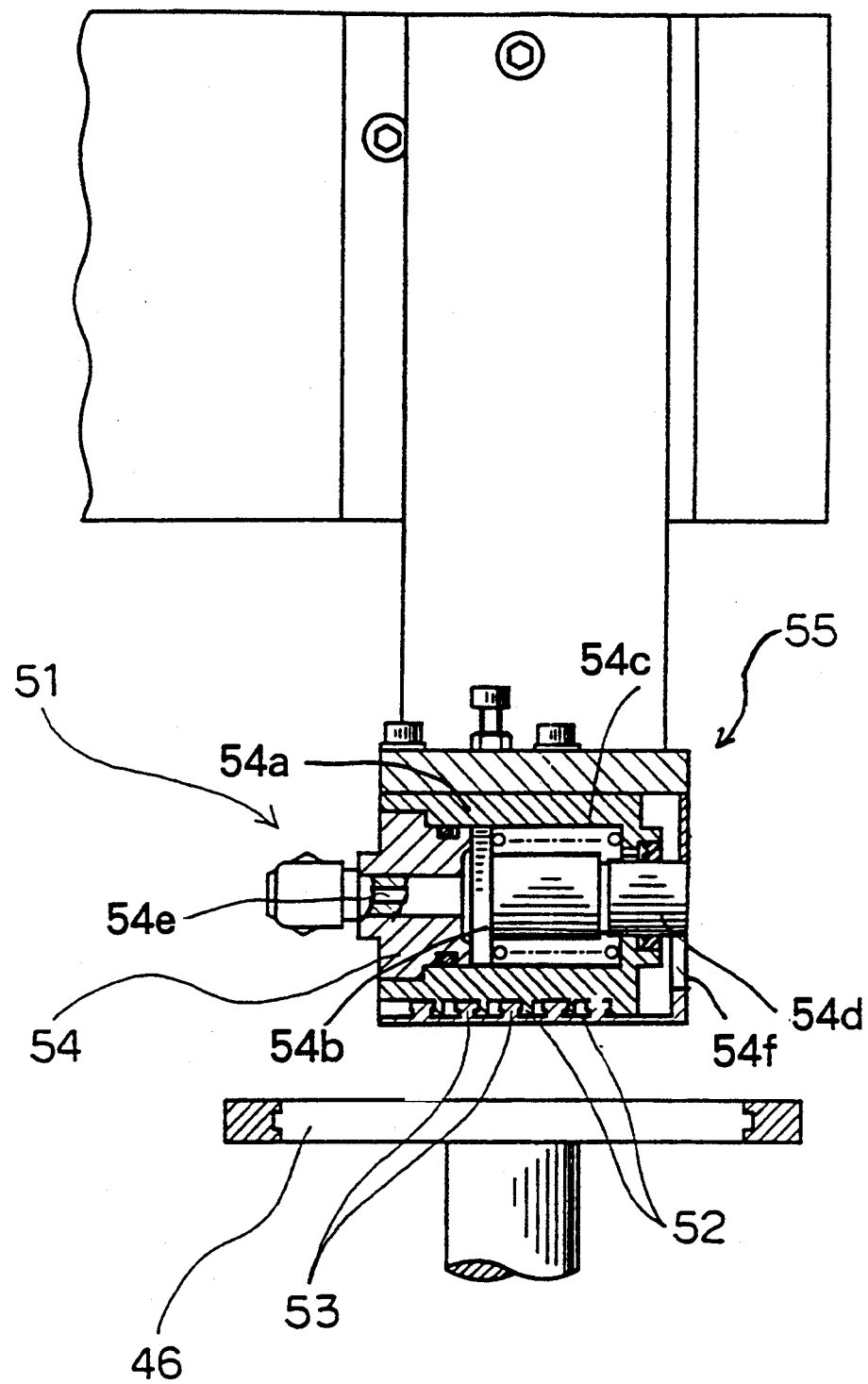
FIG. 16 is a sectional view schematically showing a separating apparatus for separating molded products from a mold die.

As shown in FIG. 16, the actuating cylinder means 54 includes a cylinder 54a, a piston 54b reciprocating in the cylinder 54a, a compression spring 54c disposed between the piston 54b and an end wall of the cyliner 54a for biasing the piston 54b toward the other end wall of the cylinder 54a, a piston rod 54d fixed at one end thereof to the piston 54b, and an oil passage 54e one end of which is joined to the other end wall of the cylinder 54a and the other end of which is connected to an oil source (not shown). The other end of the piston rod 54d is connected via a connecting member 54f to the movable claws 53 so that the piston rod 54d can move together with the movable claws 53 by introducing an oil into a space between the piston 54b and the end wall of the cylinder 54a by way of the oil passage 54e.

Figure 18:
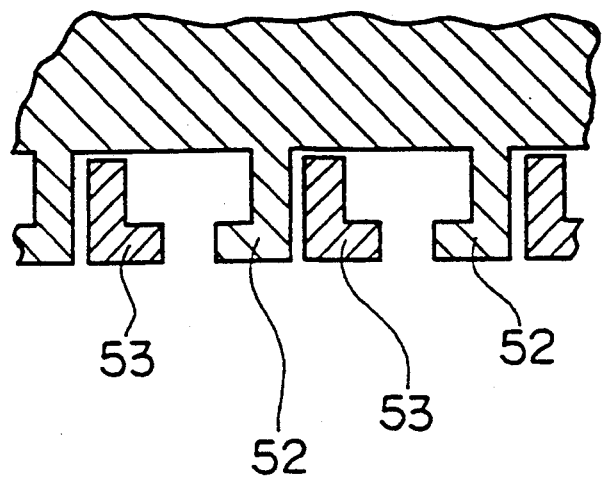
FIG. 18 is an enlarged sectional view showing an essential portion of the separating apparatus shown in FIG. 16.
Figure 19:
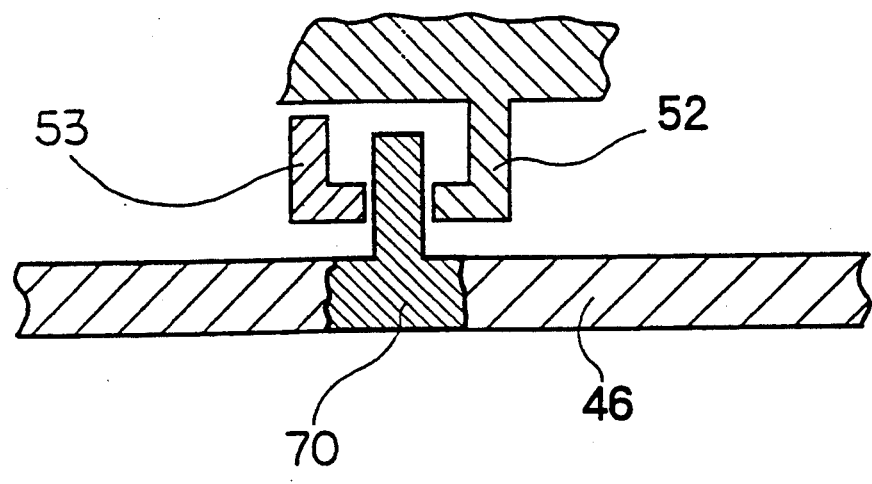
FIG. 19 is an explanation view showing the relationship between a fixed claw and a movable claw of the separating apparatus and the molded product remaining in the mold die.

Each of the movable claws 53 is arranged between the two adjacent fixed claws 52 so that one fixed claw 52 and one movable claw 53 are combined as a nipper as best shown in FIGS. 18 and 19. When the oil is introduced into the cylinder 54a, the movable claws 53 and the fixed claws 52 are opened as shown in FIG. 18 against the biasing force of the spring 54c. When the oil is discharged from the cylinder 54a, the movable claws 53 and the fixed claws 52 are closed as shown in FIG. 19 due to the biasing force of the spring 54c so as to nip the molded products 70.

Figure 17:
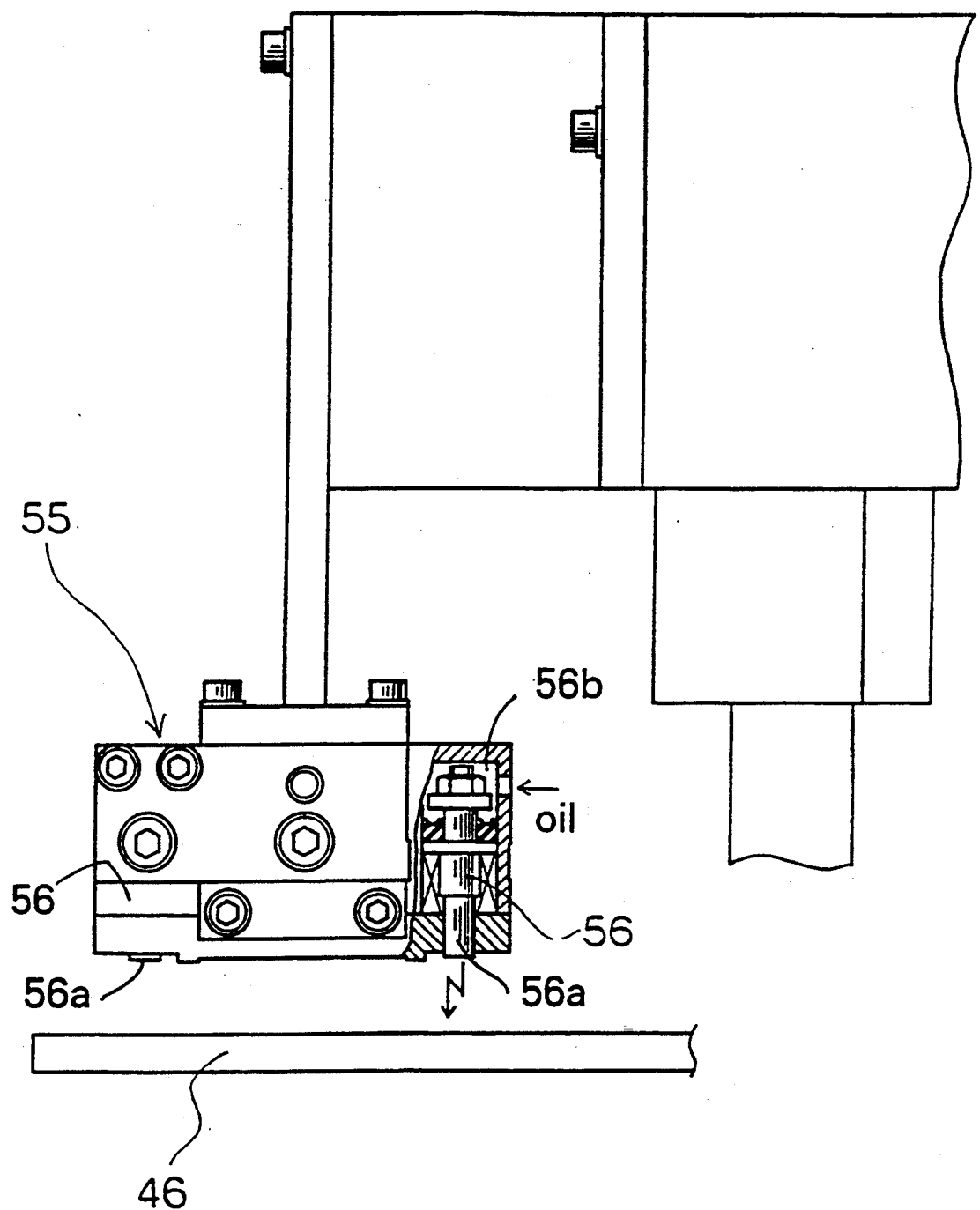
FIG. 17 is a side view showing the separating apparatus of FIG. 16.

As shown in FIG. 17, the separating means 51 further includes plural liquid actuation type pushing means 56. After the nipping means 55 nips the molded products 70 in the mold dies 45 to 47, when oil is introduced into a cylinder 56b, a rod-shaped projection 56a moves downwardly and then pushes the second mold die 46 so that the molded products 70 are simultaneously pulled upwardly and then removed from the mold dies 45 to 47 by means of the fixed and movable claws 52, 53.

Referring to FIGS. 20 to 24, the first deburring means 61 is placed below the distribution plate 44 of the die setting means 30. The second deburring means 61 is placed above the first mold die 45 as schematically shown in FIG. 1.

The first deburring means 61 will be explained in detail as the second deburring means 61 is substantially the same to the first deburring means except for the reverse arrangement directions thereof.

The first deburring means 61 is equipped with a nipping means 65 including a plurality of fixed claws 62 having an L-shape in cross section, a plurality of movable claws 63 having a reversed L-shape in cross section, and an actuating cylinder means 64 for moving the movable claws 63 relative to the fixed claws 62. The fixed and movable claws 62, 63 extend upwardly. The actuating cylinder means 64 includes a cylinder, a piston reciprocating in the cylinder, a compression spring disposed between the piston and an end wall of the cyliner for biasing the piston toward the other end wall of the cylinder, a piston rod 64a fixed at one end thereof to the piston, and an oil passage one end of which is joined to the other end wall of the cylinder and the other end of which is connected to an oil source. The other end of the piston rod 64a is connected via a connecting member 64b to the movable claws 63 so that the piston rod 64a can move together with the movable claws 63 by introducing an oil into a space between the piston and the end wall of the cylinder by way of the oil passage.

The nipping means 65 is supported by a support rod 66a which is joined to a piston rod 66b of a vertically shifting cylinder means 66. When the shifting cylinder means 66 is actuated, the nipping means 65 moves up and down.

Figure 21:
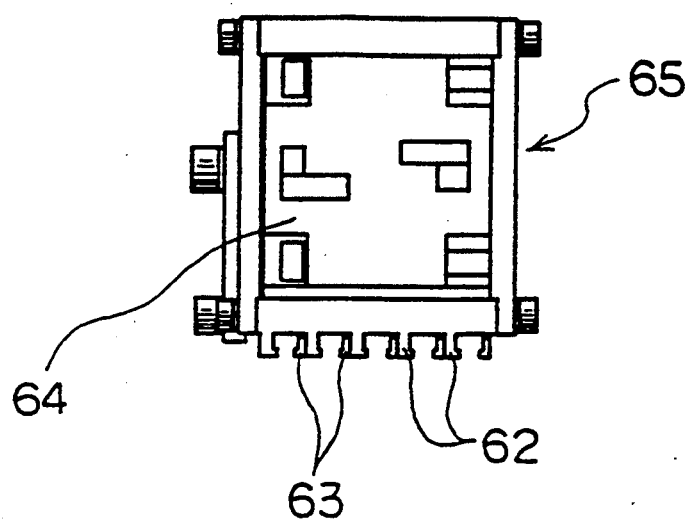
FIG. 21 is a front view showing a nipping means of a further deburring apparatus.
Figure 22:
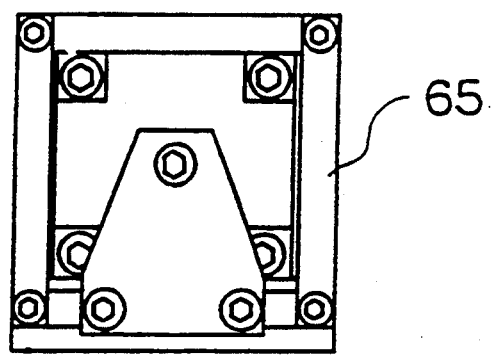
FIG. 22 is a side view showing the nipping means of FIG. 21.

FIG. 21 shows the second deburring means 61 which is equipped with a nipping means 65 including a plurality of fixed claws 62 having an L-shape in cross section, a plurality of movable claws 63 having a reversed L-shape in cross section, and an actuating cylinder means 64 for actuating the movable claws 63 relative to the fixed claws 62. The fixed and movable claws 62, 63 of the second nipping means extend downwardly as shown in FIG. 21. The cylinder means 64 of the second nipping means 61 has substantially the same mechanism as that of the cylinder means 64 of the first nipping means 61.

OPERATION

In operation, at first, one lot of mold materials 10 is fed into the pot 3 by means of the feeding means 6. If an upper surface of the mold materials 10 comes down to a predetermined level within the pot 3, it is detected by a sensor (not shown), and then the feeding means 6 is automatically actuated so that the cylindrical portion 11 containing the mold materials 10 moves horizontally in the direction of the arrow in FIG. 2. When it comes over the pot 3, the mold materials 10 are fed into the pot 3 in the vertical direction of the arrow. After that, the cylindrical portion 11 moves back to its original waiting position.

The mold material 10 in the pot 3 is heated by the heater 9. The cylinder means 5 actuates the ram 4 to move down until the ram 4 is inserted into the pot 3. As a result, the mold material 10 is extruded through the hole 8 of the pot 3 so as to form a formed body 10 having a predetermined shape.

When the shifting means 17 is actuated, the transportation member 15 moves from the point A to the point B in FIG. 2 along the grooves 20 of the guide rails 16 in the above-stated special manner. While the transportation member 15 moves in an inclined condition, it cuts the formed body 10 at the underside of the cover 7 or the bottom of the pot 3 so as to have a predetermine, short length so that the formed body 10 is supported by a top flat receiving portion of the transportation member 15. Next, the transportation member 15 partly rotates around the shaft 18 so as to be held in a horizontal direction and comes to the point B. In this condition, the blade 14 faces upwardly.

If the transportation member 15 has two parallel cutting blades 14 at both end edges thereof, then the formed body 10 is positioned between the two blades 14.

When the vertically shifting means 26 and the horizontally shifting means 25 are actuated in the transfer means 23, the suction member 24 moves down and then contacts the formed body 10 on the flat receiving portion of the transportation member 15 in a horizontally maintained condition so as to hold it due to its vacuum force. After that, the suction member 24 and the formed body 10 together are transferred by both the cylinder means 25, 26 of the transfer means 23 and then supplied into the distribution plate 44 of the die setting means 30 as best shown in FIG. 4. After the sucking force disappears, the suction member 24 moves back to its original position.

At that time, the die setting means 30 is maintained in a disassembled or open condition as shown in FIGS. 7 and 12. The mold guides 35, 36, 37, 38 support the distribution plate 44, the third mold die 45, the first mold die 46 and the second mold die 47 therein, respectively.

When the actuation source 42 starts, the four shafts 34 rotate in the directions of the arrows in FIG. 2 until the mold guides 35 to 38 and the mold dies are positioned exactly over one another as shown in FIG. 6 and as shown by dotted lines in FIG. 12. The positioning of those members can be controlled by stop pins or any conventional electrical means. After that, when the actuator source 100 starts, the four shafts 34 move in a vertical direction until the mold guides 35 to 38, the distribution plate 44 and the mold dies 45 to 47 contact each other. Thus, they are assembled as shown in FIG. 13. In addition, the ram 43 moves up so that they are pressed between the ram 43 and the upper plate 31 in order to tighten them. Thus, the molding machine is ready for injection.

On the other hand, an upper heater 48 attached to the upper plate 31 and a lower heater 49 attached to the lower plate 32 start to heat the formed body 10 in the distribution plate 44. The formed body 10 is cured and molded as shown in FIG. 15 so as to produce many rubber products 70 each having a bur or spool runner 80.

When the molding is complete, the ram 43 moves down while the actuation source 100 again starts so that the four shafts 34 move in the opposite vertical directions. The mold guides 35 to 38, the distribution plate 44 and the mold dies 45 to 47 depart from each other, assisted by, a plurality of spring means 50. After that, the four shafts 34 rotate about their axes so that the mold guides 35 to 38, the distribution plate 44 and the mold dies 45 to 47 move outwardly so as to be open.

In such an open condition, many products 70 remain in the cavities of the second mold die 46 in such a way that a top portion of each product 70 slightly protrudes upwardly from the top surface of the second mold die 46 as shown in FIGS. 15 and 19. Many spool runners or burs 80 remain in the cavities of the distribution plate 44 as shown in FIGS. 15 and 23 in such a way that a lower portion of each spool runner 80 protrudes downwardly from the bottom surface of the distribution plate 44. Some spool runners 80 remain in the first mold die 45 in such a manner that a top portion of each spool runner 80 sligtly protrudes from the top surface of the first mold die 45.

The nipping means 55 of the separating means 51 moves down until the top protruding portions of the rubber products 70 are inserted into the gaps formed between the fixed and movable claws 52, 53 as shown in FIGS. 18 and 19. Aftr that, when the cylinder means 54 is actuated, the nipping means 55 nips the rubber products 70 due to the force of the spring. Next, the cylinder means 56 is actuated so as to push the rods 56a against the second mold die 46 so that all of the products 70 can be simultaneously separated from the second mold die 46. Such separated products 70 are further transferred to a predetermined place.

Figure 20:
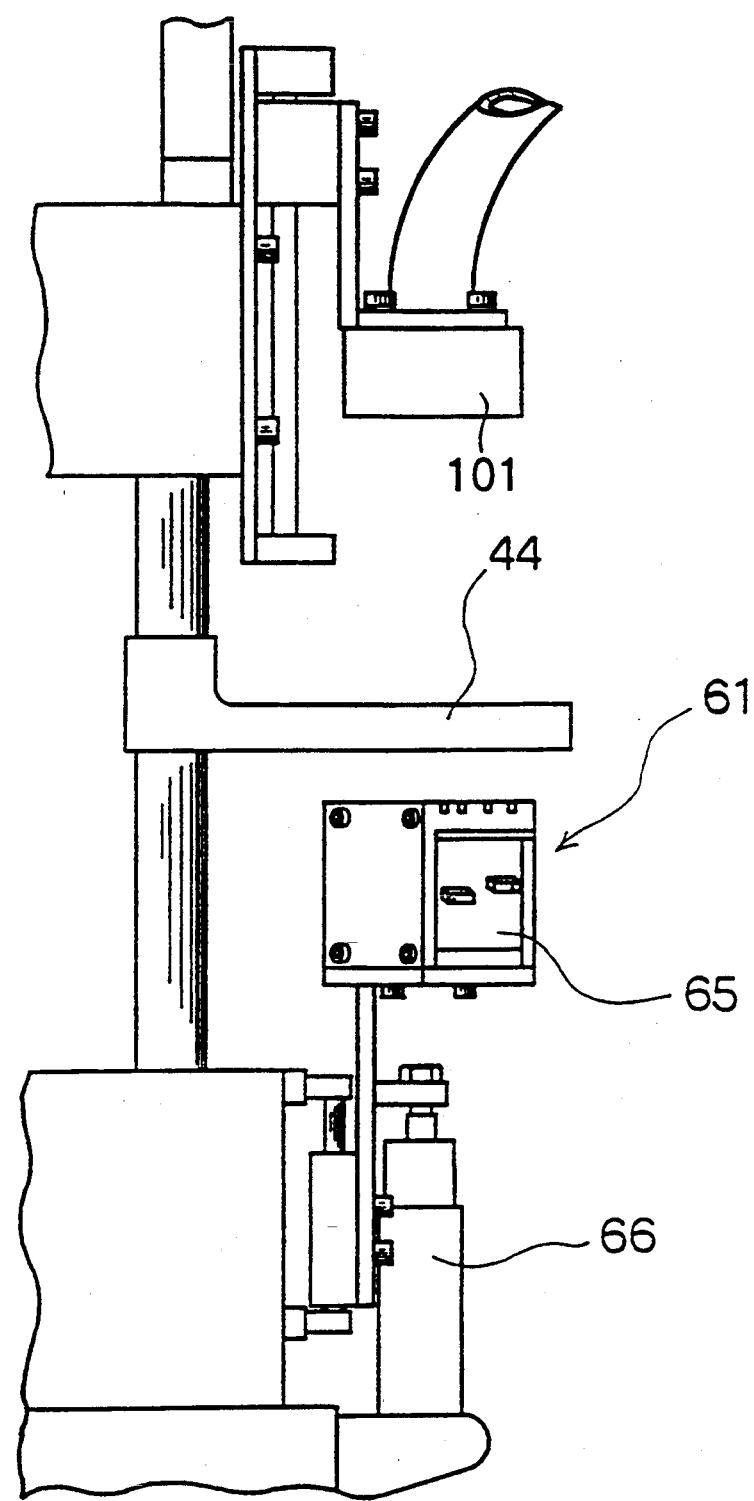
FIG. 20 is a schematic view generally showing a deburring apparatus and its related members.

On the other hand, the spool runners 80 remaining in the distribution plate 44 can be removed by the first deburring means 61. As shown in FIG. 20, the nipping means 65 moves up toward the underside of the distribution plate 44 until the bottom or lower portion of each spool runner 80 is inserted into a gap formed between the fixed claw 62 and the movable claw 63. When the cylinder means 64 is actuated, a pair of claws 62, 63 nip the lower portion of the spool runner 80. After that, the cylinder means 66 is actuated so that the nipping means 65 moves down so as to separate the spool runners 80 from the distribution plate 44.

The spool runners or burs 80 remaining in the first mold die 45 can be removed by the second deburring means 61 as shown in FIG. 21. The nipping means 65 of the second deburring means 61 moves down toward the upper surface of the first mold die 45 until the top portion of each spool runner 80 is inserted into a gap formed between the fixed claw 62 and the movable claw 63. When the cylinder means 64 is actuated, the fixed and movable claws nip the top portion of the spool runners 80. They can be removed like in the nipping means 55 of FIG. 17.

The spool runners or burs 80 which have been removed can be sucked into a suction means 101 (FIG. 20) connected to a vacuum source (not shown) so that they can be easily transportated to a desired place.

What is claimed is:

1. In a molding machine for producing products of a resilient material, a die setting apparatus comprising:
   a lower plate;
   an upper plate placed over the lower plate;
   a plurality of shafts slidable and rotatable relative to the lower plate and the upper plate;
   a plurality of mold guides fixed to the shafts, respectively, for holding and guiding mold dies;
   means for rotating the shafts together with the mold guides; and
   means for shifting the shafts together with the mold guides between the upper plate and the lower plate in an axial direction of the shafts so that the mold dies on the mold guides are configurable.

2. A die setting appratus of claim 1, further including a gear mechanism connected to the shafts for rotating simultaneously the shafts.

3. A die setting apparatus of claim 1, comprising a plurality of thrust bearings for supporting the shafts in such a manner that they are vertically movable and rotatable about their axes.

4. A die setting apparatus of claim 1, comprising:
means for rotating the shafts about their axes; and
means for vertically shifting or actuating the shafts.

5. A die setting apparatus of claim 1, comprising a tightening means which includes a ram for pressing the mold guides between the upper and lower plates when they are assembled.

6. A die setting apparatus of claim 1, wherein each of the mold guides has a stepped large-diameter opening portion for receiving and supporting the mold die and a small-diameter opening portion joined to the large-diameter opening portion for fixing the mold guide to the shafts.

7. A die setting apparatus of claim 1, wherein each of the mold dies has a plurality of cavities.

8. A die setting apparatus of claim 1, wherein an upper heater is attached to the upper plate, and a lower heater is attached to the lower plate.

* * * * *